US009687826B2

(12) United States Patent
Jothimurugesan et al.

(10) Patent No.: US 9,687,826 B2
(45) Date of Patent: *Jun. 27, 2017

(54) SUPPORT FOR FISCHER-TROPSCH CATALYST HAVING IMPROVED ACTIVITY

(71) Applicant: Chevron U.S.A. Inc., San Ramon, CA (US)

(72) Inventors: Kandaswamy Jothimurugesan, Hercules, CA (US); Howard Steven Lacheen, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,998

(22) Filed: Dec. 8, 2015

(65) Prior Publication Data
US 2016/0089662 A1    Mar. 31, 2016

Related U.S. Application Data

(63) Continuation-in-part of application No. 14/482,361, filed on Sep. 10, 2014, now abandoned.

(51) Int. Cl.
B01J 27/198     (2006.01)
B01J 35/02      (2006.01)
(Continued)

(52) U.S. Cl.
CPC .......... B01J 27/198 (2013.01); B01J 35/023 (2013.01); B01J 37/024 (2013.01); B01J 37/08 (2013.01); B01J 37/18 (2013.01); C10G 2/332 (2013.01)

(58) Field of Classification Search
CPC ........ B01J 21/04; B01J 27/14; B01J 27/1853; B01J 27/198; B01J 35/023; B01J 37/024; B01J 37/16; B01J 37/18
(Continued)

(56) References Cited

U.S. PATENT DOCUMENTS 4,629,717 A * 12/1986 Chao ................. B01J 27/16
                                                   502/208
5,863,856 A    1/1999 Mauldin
(Continued)

FOREIGN PATENT DOCUMENTS

WO    WO01/76734 A1    10/2001
WO    WO02/07883 A2    1/2002
(Continued)

Primary Examiner — Patricia L Hailey
(74) Attorney, Agent, or Firm — Susan M. Abernathy

(57) ABSTRACT

Provided is a Fischer Tropsch catalyst prepared according to a process comprising:

a. preparing a catalyst precursor by:
  i. impregnating an alumina catalyst support material with a first solution comprising ammonium metavanadate and phosphoric acid, to obtain a treated catalyst support material;
  ii. calcining the treated catalyst support material at a temperature of at least 500° C. to obtain a modified catalyst support having a modified support surface area and a pore volume of at least 0.4 cc/g; wherein the modified catalyst support loses no more than 8% of the pore volume when exposed to a water vapor; and
  iii. contacting the modified catalyst support with a second solution comprising a precursor compound of an active cobalt catalyst component and glutaric acid to obtain the catalyst precursor; and
b. reducing the catalyst precursor to activate the catalyst precursor to obtain the Fischer Tropsch catalyst.

11 Claims, 3 Drawing Sheets

(51) Int. Cl.
  *B01J 37/02*    (2006.01)
  *B01J 37/08*    (2006.01)
  *B01J 37/18*    (2006.01)
  *C10G 2/00*     (2006.01)

(58) Field of Classification Search
  USPC ............. 502/209, 213, 332, 354; 518/715
  See application file for complete search history.

(56) References Cited

U.S. PATENT DOCUMENTS

| | | |
|---|---|---|
| 7,012,104 B2 | 3/2006 | Espinoza et al. |
| 7,071,239 B2 | 7/2006 | Ortego, Jr. et al. |
| 7,176,160 B2 | 2/2007 | Espinoza et al. |
| 7,341,976 B2 | 3/2008 | Espinoza et al. |
| 7,402,612 B2 | 7/2008 | Jin et al. |
| 7,449,496 B2 | 11/2008 | Jin et al. |
| 8,394,864 B2 | 3/2013 | Van De Loosdrecht et al. |
| 8,598,066 B2 | 12/2013 | Bae et al. |
| 9,168,512 B1 * | 10/2015 | Jothimurugesan ..... B01J 23/898 |
| 9,192,921 B1 * | 11/2015 | Jothimurugesan ..... B01J 27/198 |
| 9,370,768 B2 * | 6/2016 | Jothimurugesan ..... B01J 23/898 |
| 2005/0245394 A1 | 11/2005 | Dahar et al. |
| 2005/0245623 A1 | 11/2005 | Van Berge et al. |
| 2014/0045953 A1 | 2/2014 | Daly et al. |
| 2014/0057780 A1 | 2/2014 | Bae et al. |
| 2014/0088206 A1 | 3/2014 | Daly et al. |

FOREIGN PATENT DOCUMENTS

| | | |
|---|---|---|
| WO | WO03/012008 A2 | 2/2003 |
| WO | WO2013/088290 A1 | 6/2013 |

\* cited by examiner

SUPPORT FOR FISCHER-TROPSCH CATALYST HAVING IMPROVED ACTIVITY

FIELD

The present disclosure relates generally to catalysts for use in Fischer-Tropsch processes in which synthesis gas is converted to hydrocarbon products.

BACKGROUND

Supported cobalt catalysts are commonly used in the Fischer-Tropsch synthesis (FTS) step in gas-to-liquid (GTL) processes due to their high activity and selectivity to heavy hydrocarbons. The performance of the cobalt catalysts is very important for the economics of the GTL process. The FTS process is typically performed in a three-phase slurry reactor. An important advantage of the slurry reactor over fixed bed reactors is the greatly improved heat removal capability and ease of temperature control.

Alumina is one of the most desirable catalyst supports. Due to its high surface area and good mechanical properties, the gamma form of alumina has been used widely in industry for many catalytic applications. However, in an acidic or alcohol containing reaction medium such as Fischer-Tropsch synthesis conditions to produce wax, or other reactions proceeding in aqueous medium such as alcohol, ether, and ester syntheses, an alumina support exhibits a stability problem. Alumina may dissolve or leach slowly in the reactor due to attacks of acid and alcohol byproducts in the reaction medium. Dissolution of alumina support in acid medium is detrimental in catalyst stability. The dissolution of the support may cause poor catalyst integrity and possible fines generation. Fines generation will hurt the subsequent filtration and post processing operations. High metal or metal compound content in a Fischer-Tropsch product is undesirable because such contaminants could have adverse effects for the Fischer-Tropsch process, such as causing reactor plugging or significantly reducing catalyst life. As a result, it is important that the product of the Fischer-Tropsch process be free of metal and other contaminants that could adversely affect its subsequent processing. Thus it is highly desirable to have an alumina catalyst support with much improved acid resistance.

The churning of the contents of the three-phase slurry reactor exerts a significant mechanical stress on the suspended catalysts, placing a high premium on their mechanical integrity to avoid attrition of the catalyst particles in the slurry. By attrition is meant physical breakdown of the catalyst particles caused by friction or grinding as a result of impact with other particles. The cobalt catalyst in the FTS slurry is additionally susceptible to hydrothermal attack that is inherent to the FTS process at conventional slurry conditions because of the presence of water at high temperatures. Such hydrothermal attack is particularly a factor on exposed and unprotected catalyst support material, resulting in weaker support material such that the catalyst is more susceptible to attrition. Such catalyst attrition can result in contamination of the produced heavy hydrocarbons (i.e., wax) with fines. It would be desirable to have a cobalt Fischer-Tropsch catalyst having improved hydrothermal stability for use in slurry reactors.

It would further be desirable to have a cobalt Fischer-Tropsch catalyst having improved catalytic activity.

SUMMARY

In one aspect, a process is provided for preparing a Fischer Tropsch catalyst precursor. The process includes contacting an alumina catalyst support material with a first solution containing a vanadium compound and a phosphorus compound. The catalyst support material is calcined at a temperature of at least 500° C. to obtain a modified catalyst support having a pore volume of at least 0.4 cc/g. The modified catalyst support loses no more than 8% of its pore volume when exposed to water vapor. The modified catalyst support is contacted with a second solution which includes a precursor compound of an active cobalt catalyst component and an organic compound to obtain a catalyst precursor. In one embodiment, the organic compound is glutaric acid.

In another aspect, a process is provided for preparing a Fischer Tropsch catalyst. The catalyst precursor is prepared as described above, and the catalyst precursor is reduced to activate the catalyst precursor to obtain the Fischer Tropsch catalyst.

In another aspect, a process is provided for Fischer Tropsch synthesis including contacting a gaseous mixture comprising carbon monoxide and hydrogen with the Fischer Tropsch catalyst prepared as described above at a pressure of from 0.1 to 3 MPa and a temperature of from 180 to 260° C. A product comprising $C_{5+}$ hydrocarbons is produced.

DESCRIPTION OF THE DRAWINGS

These and other objects, features and advantages of the present invention will become better understood with reference to the following description, appended claims and accompanying drawings where:

DETAILED DESCRIPTION

Figure 1:
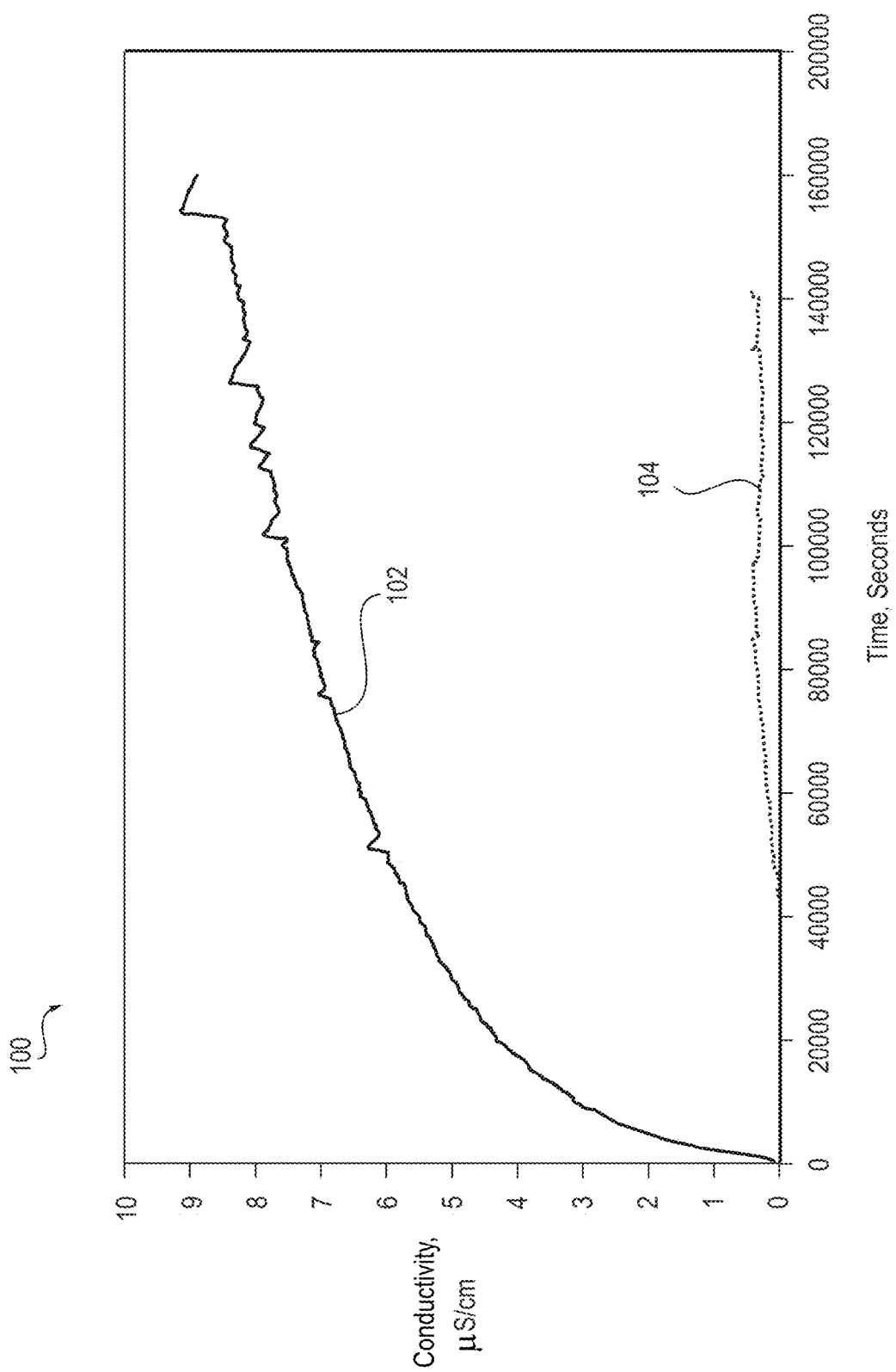
FIG. 1 is a graph illustrating the dissolution profile of vanadium-phosphorus modified alumina supports according to one exemplary embodiment.

In one embodiment, a catalyst support is modified with a first solution containing a vanadium compound and a phosphorus compound, in order to minimize the undesirable effects of hydrothermal attack on an FTS catalysts based on the support. The use of the modified catalyst support can reduce the occurrence of ultra-fine particles contaminating the waxy hydrocarbon product of the FTS step in a GTL process. The modified catalyst support, also referred to herein as a Fischer-Tropsch catalyst precursor, is prepared according to the following process. Alumina particles are selected as the catalyst support material. In one embodiment, gamma alumina particles are selected as the catalyst support material. Alternatively, boehmite particles can be used as the starting catalyst support material.

In one embodiment, the gamma alumina particles have a diameter from 10 μm to 200 μm. The average particle size may be from 60 μm to 100 μm. In one embodiment, the gamma alumina particles have a BET pore volume of from 0.4 cc/g to 1.0 cc/g.

Vanadium and phosphorous are added to alumina by co-impregnation with different V/P molar ratios. In one embodiment, ammonium metavanadate and phosphoric acid are dissolved in water. The solution can be heated to facilitate dissolution. The solution can then be added to the alumina catalyst support material by any suitable method, e.g., incipient wetness impregnation method. In one embodiment, the molar ratio of vanadium to phosphorus in the solution is from 0.05 to 6.0, and even from 0.1 to 4.0. The combined amount of vanadium and phosphorus in the first solution can be from 1 to 10 weight percent. The modified catalyst support material can then be slowly dried, e.g., at a temperature of from 110° to 120° C. to spread the metals over the entire support. The drying step can be conducted in air.

The modified catalyst support material is then calcined in flowing air at a temperature of at least 500° C. to obtain a modified catalyst support. In one embodiment, the catalyst support material is calcined at a temperature of at least 700° C. Calcination should be conducted by using a slow heating rate of, for example, 0.5° to 3° C. per minute or from 0.5° to 1° C. per minute, and the catalyst should be held at the maximum temperature for a period of between 1 and 20 hours.

The modified catalyst support has been found to have a pore volume of at least 0.4 cc/g. The test for hydrothermal stability of the catalyst support is performed using a steaming test. The steaming test includes exposing 1-2 g of modified catalyst support to about 15-30 g of water for 2-20 hours in an autoclave at a temperature of 220-240° C. The modified catalyst support sample is cooled down to room temperature and then dried at 120° C. for 2 hours. Physical analyses are carried out on the modified support alumina support before and after the steam treatment. The modified catalyst support has been found to lose no more than 8% of its pore volume when exposed to water vapor.

The modified catalyst support is then contacted with a second solution that contains a precursor compound of an active cobalt catalyst component and an organic compound to obtain a FTS catalyst precursor. In one embodiment, the modified catalyst support is contacted with the second solution by impregnation, e.g., incipient wetness impregnation. The organic compound can be a carboxylic acid containing five carbon atoms. Preferably, the organic compound is glutaric acid. The amount of glutaric acid in the second solution can be from 2 to 15 μmol glutaric acid/m$^2$ relative to the modified support surface area.

The impregnated catalyst is then dried. The impregnation using the second solution can be repeated as needed until the desired cobalt loading is achieved. Multiple impregnations are often needed to achieve the desired metal loading, with intervening drying and calcination treatments to disperse and decompose the metal salts. The second solution and support are stirred while evaporating the solvent at a temperature of from about 25° to about 50° C. until "dryness." The impregnated catalyst is slowly dried at a temperature of from about 110° to about 120° C. for a period of about 1 hour so as to spread the metals over the entire support. The drying step may be conducted at a very slow rate in air.

The dried catalyst may then be reduced or it may be calcined first. The dried catalyst is calcined by heating slowly in flowing air, for example 10 cc/gram/minute, to a temperature in the range of from about 200° to about 350° C., for example, from about 250° to about 300° C., that is sufficient to decompose the metal salts and fix the metals. The aforesaid drying and calcination steps can be done separately or can be combined. However, calcination should be conducted by using a slow heating rate of, for example, 0.5° to about 3° C. per minute or from about 0.5° to about 1° C. per minute and the catalyst should be held at the maximum temperature for a period of about 1 to about 20 hours, for example, for about 2 hours.

The foregoing impregnation steps are repeated with additional solutions in order to obtain the desired metal loading, i.e., from 5 wt % to 45 wt % cobalt, even from 20 wt % to 35 wt % cobalt. Metal promoters can be added with the FT component, but they may be added in other impregnation steps, separately or in combination, before, after or between impregnations of FT component. In one embodiment, the catalyst precursor further contains a promoter selected from the group consisting of platinum, ruthenium, silver, palladium, lanthanum, cerium and combinations thereof. The promoter can be added to the second solution or to a subsequent solution, and applied to the modified catalyst support by impregnation. The catalyst precursor can contain the promoter in an amount from 0.01 wt % to 5 wt %.

A Fischer-Tropsch catalyst can then be prepared from the catalyst precursor by reducing the catalyst precursor to activate the catalyst precursor. In one embodiment, the catalyst precursor is placed in a tube reactor in a muffle furnace. The tube can be purged first with nitrogen gas at ambient temperature, after which time the gas feed can be changed to pure hydrogen. The temperature to the reactor can be increased, for example, to 450° C. at a rate of 1° C./minute and then held at that temperature for ten hours. After this time, the gas feed can be switched to nitrogen to purge the system and the unit can be cooled to ambient temperature. Then a gas mixture of 1 volume % $O_2/N_2$ can be passed up through the catalyst bed at 750 sccm for 10 hours to passivate the catalyst.

Advantageously, the Fischer-Tropsch catalyst prepared as described herein loses no more than about 10%, even no more than 8%, of its pore volume when exposed to water vapor. In one embodiment, the catalyst loses not more than 6% its pore volume when the catalyst is contacted with a feed stream at a temperature greater than 200° C. in the presence of water. Furthermore, the Fischer-Tropsch catalyst prepared as described herein wherein the second solution contains glutaric acid has been found to have cobalt oxide ($Co_3O_4$) crystallites having an average size of no greater than 20 nm, even from 6 to 20 nm. Such small crystallite size results in high catalytic activity.

In one embodiment, a process of Fischer-Tropsch synthesis is conducted by contacting a gaseous mixture comprising carbon monoxide and hydrogen with the Fischer-Tropsch catalyst prepared as disclosed herein at a pressure of from 0.1 to 3 MPa and a temperature of from 180 to 260° C. The FTS process can occur in a slurry reactor or a continuously stirred tank reactor. The resulting product contains $C_{5+}$ hydrocarbons.

EXAMPLES

Test Methods

Average Crystallite Particle Size by X-ray Diffraction (XRD)

Cobalt oxide ($Co_3O_4$) crystallite size was estimated using the Scherrer equation with Warren's correction. Particle sizes by Scherrer equation were calculated for $Co_3O_4$ at the 311 reflection with 2Θ of about 36.8°.

Cobalt oxide ($Co_3O_4$) crystallite size was also estimated using the XRD Double Voigt method, using the procedure given below for calculating crystallite size distributions.

Crystallite Size Distribution

Crystallite size distributions were calculated from peak profiles evaluated with a Voigt function, which is a convolution of Lorentzian and Gaussian functions. The resulting Lorentzian and Gaussian integral breadths were used as inputs to the computer program BREADTH (*J. Appl. Cryst.* 26 (1993) 97-103). The program calculates the volume weighted distribution profiles using the Double Voigt method and the volume weighted average particle size.
Full Width at Half the Maximum (FWHM)

Full Width at Half the Maximum (FWHM) is a parameter used to indicate the broadness of a peak, in this case the volume distribution function.

Figure 3:
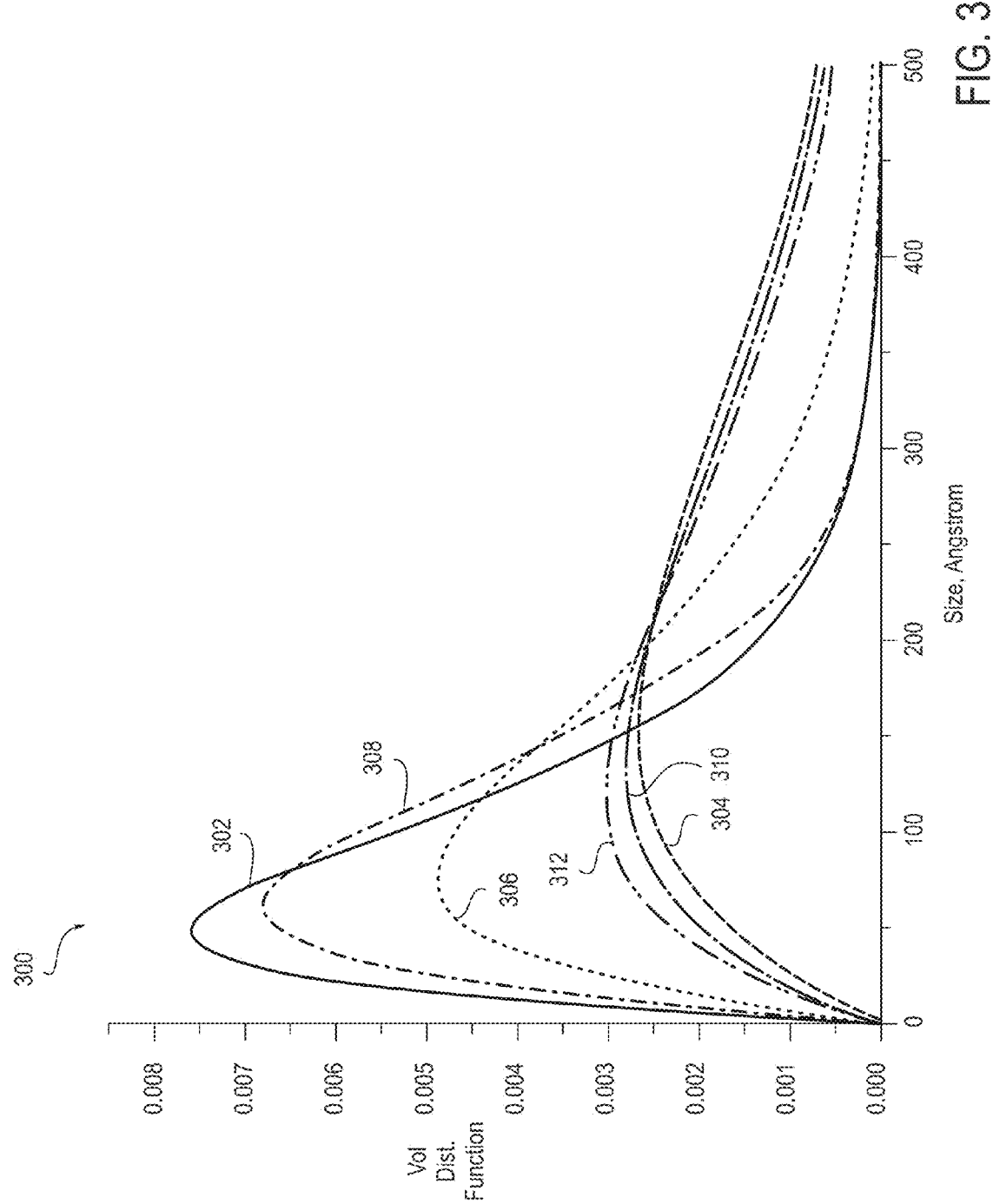
FIG. 3 is a graph of volume distribution function, also referred to as volume weighted distribution profile, versus particle size for cobalt oxide crystallite size for comparative and exemplary catalysts.

The values of FWHM in Table 2 were calculated by modeling particle size distributions, in FIG. 3, with an asym2sig function in OriginPro data analysis software (available from OriginLab Corporation, Northampton, Mass.) with the form:

$$y = y_0 + A \cdot \frac{1}{1+e^{-\frac{x-x_c+w_1/2}{w_2}}} \cdot \left[1 - \frac{1}{1+e^{-\frac{x-x_c+w_1/2}{w_3}}}\right]$$

where $w_1$ is the FWHM, $y_0$ is the offset, $x_c$ is the center, A is the amplitude, $w_2$ is low-side variance, and $w_3$ is the high-side variance.

Comparative Example 1

Gamma alumina SA63158 (obtained from Saint-Gobain NorPro Corporation, Stow, Ohio) was used as a catalyst support.

Example 1

Vanadium and phosphorous were supported on the gamma alumina by impregnation with vanadium and phosphorous having a molar ratio of 1.2. $NH_4VO_3$ (obtained from Sigma-Aldrich, St. Louis, Mo.) was added to distilled water and then phosphoric acid was added to the vanadium solution. This solution was stirred for 1 h at 70° C. The solution was then cooled to room temperature and added to the gamma alumina supports by incipient wetness impregnation method. The material was then dried in an oven at 120° C. overnight. Finally, the dried modified alumina support was calcined at 750° C. for 2 hours in a muffle furnace.

Comparative Example 1A

PB600 boehmite alumina support (obtained from obtained from Pacific Industrial Development Coporation) was dispersed in deionized water to achieve a solid content of about 20% by weight of the solution. The slurry was subsequently spray dried to form spherical granules. The spray dried material was then further treated in an oven at 120° C. overnight. Finally, the dried alumina support was calcined at 750° C. for 2 hours in a muffle furnace.

Example 1A

PB600 boehmite alumina support (obtained from obtained from Pacific Industrial Development Coporation) was dispersed in deionized water to achieve a solid content of about 25% by weight of the solution. $NH_4VO_3$ (obtained from Sigma-Aldrich, St. Louis, Mo.) and phosphoric acid (obtained from Sigma-Aldrich, St. Louis, Mo.) were dissolved in deionized water. This solution was stirred for 1 h at 70° C. The solution was then cooled to room temperature and added to the above boehmite slurry. The slurry was subsequently spray dried to form spherical granules. The spray dried material was then further treated in an oven at 120° C. overnight. Finally, the dried modified alumina support was calcined at 750° C. for 2 hours in a muffle furnace.

Comparative Example 1B

85% of 18N480 boehmite (obtained from Sasol, which had a bulk density 0.87 g/ml) and 15% of Pural TH100 (obtained from Sasol, which had a bulk density 0.39 g/ml) were dispersed in deionized water to achieve a solid content of about 20% by weight of the solution. The slurry was subsequently spray dried to form spherical granules. The spray dried material was then further treated in an oven at 120° C. overnight. Finally, the dried alumina support was calcined at 750° C. for 2 hours in a muffle furnace.

Example 1B

85% of 18N480 boehmite (obtained from Sasol, which had a bulk density 0.87 g/ml) and 15% of Pural TH100 (obtained from Sasol, which had a bulk density 0.39 g/ml) were dispersed in deionized water to achieve a solid content of about 20% by weight of the solution. $NH_4VO_3$ (obtained from Sigma-Aldrich, St. Louis, Mo.) and phosphoric acid (obtained from Sigma-Aldrich, St. Louis, Mo.) were dissolved in deionized water. This solution was stirred for 1 h at 70° C. The solution was then cooled to room temperature and added to the above boehmite slurry. The slurry was subsequently spray dried to form spherical granules. The spray dried material was then further treated in an oven at 120° C. overnight. Finally, the dried modified alumina support was calcined at 750° C. for 2 hours in a muffle furnace.

Comparative Example 1C

85% of 18N480 boehmite (obtained from Sasol, which had a bulk density 0.87 g/ml) and 15% of Pural TH100 (obtained from Sasol, which had a bulk density 0.39 g/ml) were dispersed in deionized water to achieve a solid content of about 20% by weight of the solution. The slurry was subsequently spray dried to form spherical granules. The spray dried material was then further treated in an oven at 120° C. overnight. Finally, the dried alumina support was calcined at 750° C. for 2 hours in a muffle furnace Example 1C Vanadium and phosphorous were supported on the alumina by impregnation with vanadium and phosphorous having a molar ratio of 1.2. NH4VO3 (obtained from Sigma-Aldrich, St. Louis, Mo.) was added to distilled water; and then phosphoric acid was added to the vanadium solution. This solution was stirred for 1 h at 70° C. The solution was then cooled to room temperature and added to the alumina support used in Comparative Example 1C by incipient wetness impregnation method. The material was then dried in an oven at 120° C. overnight. Finally, the dried modified alumina support was calcined at 750° C. for 2 hours in a muffle furnace.

Acid Resistance of Supports

When alumina dissolves in an aqueous acid medium, aluminum ions are formed. A method to obtain the cumulative aluminum ion dissolution profile was disclosed U.S.

Pat. No. 6,875,720 to Van Berge et al., in which the concentration of aluminum ions was estimated using conductivity measurements at a constant pH as a function of time.

In the present disclosure, the increase of aluminum ions over time was observed by monitoring the conductivity over time using a procedure similar to that disclosed by van Berge et al. For this experiment, 2 g of a support sample was slurried in a dilute nitric acid solution. Then the conductivity was monitored for 30-40 hours. The increase of aluminum ions over time can be monitored by measuring the conductivity of the solution using Metrohm Conductivity Cell with Pt 1000 (C=0.7) over a range of 5-20,000 µS/cm at a constant pH of 2.0 using Metrohm Gel electrode with NTC (using plug head U). The pH was kept constant at pH 2.0 by the automated addition of a 10% nitric acid solution using the 907 Titrando by Metrohm USA (Riverview, Fla.) and Tiamo™ titration software available from Metrohm USA. The conductivity change is due to aluminum dissolution to form $Al^{3+}$. The conductivity change in µS/cm is plotted as a function of time in seconds in FIG. 1. The FIG. 100 clearly indicates that vanadium-phosphorus modified alumina (Example 1, shown as curve 104) shows much lower conductivity increase than pure gamma alumina at constant acid consumption (Comparative Example 1, shown as curve 102), demonstrating the present modified alumina exhibits improved acid resistance.

Hydrothermal Stability of Alumina Supports

Hydrothermal stability testing of the modified support of Example 1 and the unmodified support of Comparative Example 1 was performed in a high pressure Parr reactor. 2 grams of support sample and 15 g of water were charged to an autoclave and heated at 220° C. and a pressure of 370 psig for 2 hours. The support sample was cooled down to room temperature and then dried at 120° C. for 2 hours. Two samples (before and after steaming) were then analyzed for change in pore volume. Pore volume of support samples were determined from nitrogen adsorption/desorption isotherms measured at −196° C. using a Tristar analyzer available from Micromeritics Instrument Corporation (Norcross, Ga.). Prior to gas adsorption measurements, the catalyst samples were degassed at 190° C. for 4 hours. Table 1 shows the relative percentage change in pore volume of the modified support of Example 1 and the un-modified support of Comparative Example 1, as calculated by the following formula:

% change=(pore volume before steam test-pore volume after steam test)/(pore volume before steam test)

From Table 1 it is evident that the vanadium-phosphorus modified supports showed enhanced hydrothermal stability compared to the unmodified alumina support. The catalysts using the modified supports lost no more than 6% of their pore volume when exposed to water vapor.

TABLE 1

| Example Number | Pore Volume, cc/g | | |
|---|---|---|---|
| | Before steaming | After steaming | % Change |
| Comparative Example 1 | 0.574 | 0.110 | 80.8 |
| Example 1 | 0.507 | 0.481 | 5.1 |
| Comparative Example 1A | 0.3979 | 0.0385 | 90.3 |

TABLE 1-continued

| Example Number | Pore Volume, cc/g | | |
|---|---|---|---|
| | Before steaming | After steaming | % Change |
| Example 1A | 0.3491 | 0.3394 | 2.77 |
| Comparative Example 1B | 0.4642 | 0.2041 | 56.03 |
| Example 1B | 0.4501 | 0.4230 | 7.86 |
| Comparative Example 1C | 0.4642 | 0.2041 | 56.03 |
| Example 1C | 0.4052 | 0.3867 | 4.56 |

Figure 2:
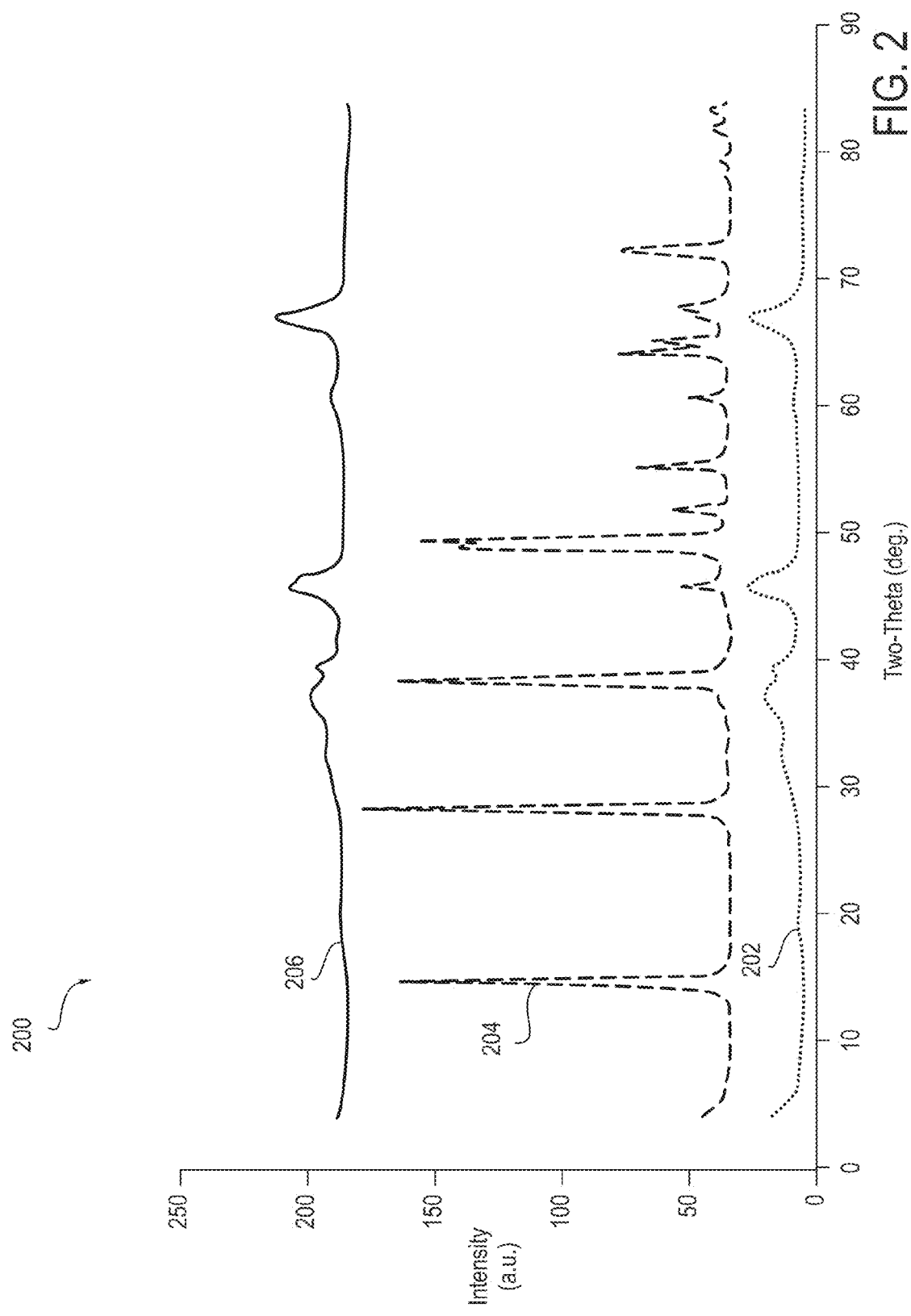
FIG. 2 is a graph of x-ray diffraction (XRD) results before and after steaming comparing one exemplary embodiment modified with glutaric acid with comparative examples.

X-ray diffraction (XRD) results of the supports before and after steaming are shown in FIG. 2 (200). The comparative XRD results in FIG. 2 show that the unmodified gamma alumina was completely transformed to boehmite after the steam treatment (Comparative Example 1, shown as curve 202 before steam treatment and as 204 after steam treatment). However, the XRD pattern of the vanadium-phosphorus modified alumina (Example 1, shown as curve 206) after the same steam treatment shows a gamma alumina pattern.

Comparative Example 2

A three-step incipient wetness impregnation method was used to prepare a Fischer-Tropsch catalyst. A solution was prepared by dissolving cobalt(II) nitrate hexahydrate (obtained from Sigma-Aldrich), tetraammineplatinum(II) nitrate (obtained from Alfa Aesar, Ward Hill, Mass.) and lanthanum (III) nitrate hexahydrate (obtained from Sigma-Aldrich) in water. Alumina from Comparative Example 1 was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 30 wt % Co, 0.05 wt % Pt, 1 wt % $La_2O_3$ and 68.95 wt % alumina.

Comparative Example 3

A three-step incipient wetness impregnation method was used to prepare the Fischer-Tropsch catalyst. A solution was prepared by dissolving cobalt(II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) in water. Modified alumina from Example 1 was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 30 wt % Co, 0.05% Pt and 1 wt % $La_2O_3$ and 68.95 wt % alumina.

Comparative Example 4

A three-step incipient wetness impregnation method was used to prepare the Fischer-Tropsch catalyst. A solution was prepared by dissolving cobalt(II) nitrate hexahydrate (obtained from Sigma-Aldrich), tetraammineplatinum (II)

nitrate (obtained from Alfa Aesar) and lanthanum (III) nitrate hexahydrate (obtained from Sigma-Aldrich) and a specified amount of citric acid (obtained from Sigma-Aldrich) as identified in Table 2, in water. Modified alumina from Example 1 was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 30 wt % Co, 0.05% Pt and 1 wt % $La_2O_3$ and 68.95 wt % alumina.

Comparative Example 5

A three-step incipient wetness impregnation method was used to prepare the Fischer-Tropsch catalyst. A solution was prepared by dissolving cobalt(II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a specified amount of aconitic acid (obtained from Sigma-Aldrich) as identified in Table 2, in water. Modified alumina from Example 1 was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 30 wt % Co, 0.05% Pt and 1 wt % $La_2O_3$ and 68.95 wt % alumina.

Examples 2-8

A three-step incipient wetness impregnation method was used to prepare the Fischer-Tropsch catalysts. A solution was prepared by dissolving cobalt(II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a specified amount of glutaric acid (obtained from Sigma-Aldrich) as identified in Table 2, in water. Modified alumina supports from Example 1 were impregnated by using one-third of this solution to achieve incipient wetness. The prepared catalysts were then dried in air at 120° C. for 16 hours in a box furnace and subsequently calcined in air by raising their temperature at a heating rate of 1° C./min to 300° C. and holding at that temperature for 2 hours before cooling back to ambient temperature. The above procedure was repeated to obtain the following loading of Co, Pt and $La_2O_3$ on the supports: 30 wt % Co, 0.05% Pt and 1 wt % $La_2O_3$ and 68.95 wt % alumina.

Example 9

A three-step incipient wetness impregnation method was used to prepare the Fischer-Tropsch catalyst. A solution was prepared by dissolving cobalt(II) nitrate hexahydrate (obtained from Sigma-Aldrich), tetraammineplatinum (II) nitrate (obtained from Alfa Aesar) and lanthanum (III) nitrate hexahydrate (obtained from Sigma-Aldrich) and a specified amount of glutaric acid (obtained from Sigma-Aldrich) as identified in Table 2, in water. Modified alumina supports from Example 1C were impregnated by using one-third of this solution to achieve incipient wetness. The prepared catalyst was then dried in air at 120° C. for 16 hours in a box furnace and subsequently calcined in air by raising their temperature at a heating rate of 1° C./min to 300° C. and holding at that temperature for 2 hours before cooling back to ambient temperature. The above procedure was repeated to obtain the following loading of Co, Pt and $La_2O_3$ on the supports: 25 wt % Co, 0.04% Pt and 1 wt % $La_2O_3$ and 73.96 wt % alumina.

Catalysts were analyzed for their average crystallite size using XRD, both by XRD Scherrer method and XRD Double Voigt method. The two XRD methods gave comparable average sizes. As seen from the data in Table 2, the use of glutaric acid reduces the average $Co_3O_4$ crystallite size. The average $Co_3O_4$ crystallite size is shown to decrease as the amount of glutaric acid used increases.

In FIG. 3 (300), the volume distribution function is plotted against the crystallite size in angstroms. As the figure shows, the examples of the invention, i.e., Examples 3 (shown as curve 306), 5 (shown as curve 308) and 7 (shown as curve 302) that were prepared using glutaric acid have narrower crystallite size distributions than the comparative examples. Comparative Examples 3, 4 and 5 are shown as curves 304, 310 and 312, respectively. This can be further seen from the FWHM data in Table 2, indicating that the broadness of the distribution of the $Co_3O_4$ crystallite size is desirably narrowed as the amount of glutaric acid used increases.

Thus it is shown that an advantage of the disclosed method is the ability to prepare catalysts having narrower particle size distribution, to avoid synthesizing cobalt particles of undesirable size. The disclosed method can be used to avoid making particles that are undesirably small, which may form methane and have high deactivation, as well as to avoid making particles that are undesirably large, which may be less active.

TABLE 2

| Example | Acid | μmol acid/m² surface area of modified support | Weight of acid, g/60 g support | Average $Co_3O_4$ size, nm, by XRD Scherrer method | Average $Co_3O_4$ size, nm, by XRD Double Voigt method | Full Width at Half the Maximum (FWHM), angstroms |
|---|---|---|---|---|---|---|
| Comparative Example 3 | No acid | No acid | 0 | 23 | 27 | 296 |
| Comparative Example 4 | Citric acid | 8.07 | 13.1 | 25 | 26 | 255 |
| Comparative Example 5 | Aconitic acid | 8.09 | 11.9 | 27 | 24 | 234 |
| Example 2 | Glutaric acid | 2.69 | 3 | 20 | Not available | Not available |
| Example 3 | Glutaric acid | 3.58 | 4 | 17 | 15 | 151 |

TABLE 2-continued

| Example | Acid | μmol acid/m² surface area of modified support | Weight of acid, g/60 g support | Average Co₃O₄ size, nm, by XRD Scherrer method | Average Co₃O₄ size, nm, by XRD Double Voigt method | Full Width at Half the Maximum (FWHM), angstroms |
| --- | --- | --- | --- | --- | --- | --- |
| Example 4 | Glutaric acid | 4.48 | 5 | 15 | Not available | Not available |
| Example 5 | Glutaric acid | 5.38 | 6 | 12 | 11 | 118 |
| Example 6 | Glutaric acid | 8.06 | 9 | 12 | Not available | Not available |
| Example 7 | Glutaric acid | 10.75 | 12 | 10 | 10 | 92 |
| Example 8 | Glutaric acid | 13.44 | 15 | 10 | Not available | Not available |
| Example 9 | Glutaric acid | 8.06 | 9 | 12 | 13 | 121 |

Hydrothermal Stability of Fischer-Tropsch Catalysts

The hydrothermal stability of the modified and unmodified catalysts was performed in a high pressure Parr reactor. 2 grams of catalyst samples and 30 g of water were charged to an autoclave and heated at 220° C. and a pressure of 390 psig for 20 hours. The catalyst samples were cooled to room temperature and then dried at 120° C. for 2 hours. Each catalyst sample was tested for change in pore volume, before and after steaming. Pore volume of catalyst samples were determined from nitrogen adsorption/desorption isotherms measured at −196° C. using a Tristar analyzer available from Micromeritics Instrument Corporation (Norcross, Ga.). Prior to gas adsorption measurements, the catalyst samples were degassed at 190° C. for 4 hours.

Table 3 shows the relative percentage change in pore volume of the catalyst samples, as calculated by the following formula:

% change=(pore volume before steam test−pore volume after steam test)/(pore volume before steam test)

TABLE 3

| | Pore Volume, cc/g | | |
| --- | --- | --- | --- |
| Example Number | Fresh catalyst | Catalyst after steaming | % Change |
| Comparative Example 2 | 0.2348 | 0.1598 | 31.9 |
| Comparative Example 3 | 0.2333 | 0.2195 | 5.9 |
| Example 2 | 0.2248 | 0.2089 | 7.1 |
| Example 3 | 0.2196 | 0.2124 | 3.3 |
| Example 4 | 0.2258 | 0.2155 | 4.6 |
| Example 5 | 0.2260 | 0.2114 | 6.4 |
| Example 6 | 0.2269 | 0.2140 | 5.7 |
| Example 7 | 0.2317 | 0.2215 | 4.4 |
| Example 8 | 0.2406 | 0.2274 | 5.5 |
| Example 9 | 0.2049 | 0.2013 | 1.8 |

It can be seen from Table 3 that the performance of the catalyst on the vanadium-phosphorus modified supports showed enhanced hydrothermal stability compared to the catalyst on the unmodified alumina support with same cobalt loading.

Catalyst Activation

Twenty grams of each catalyst prepared as described above was charged to a glass tube reactor. The reactor was placed in a muffle furnace with upward gas flow. The tube was purged first with nitrogen gas at ambient temperature, after which time the gas feed was changed to pure hydrogen with a flow rate of 750 sccm. The temperature to the reactor was increased to 350° C. at a rate of 1° C./minute and then held at that temperature for ten hours. After this time, the gas feed was switched to nitrogen to purge the system and the unit was then cooled to ambient temperature. Then a gas mixture of 1 volume % O₂/N₂ was passed up through the catalyst bed at 750 sccm for 10 hours to passivate the catalyst. No heating was applied, but the oxygen chemisorption and partial oxidation exotherm caused a momentary temperature rise. After 10 hours, the gas feed was changed to pure air, the flow rate was lowered to 200 sccm and then kept for two hours. Finally, the catalyst was discharged from the glass tube reactor.

A liter CSTR was used for the slurry FTS reaction. The catalyst was transferred to the CSTR unit to mix with 300 g of C-80 Sasol wax. The catalyst was flushed with nitrogen for a period of two hours, after which time the gas feed was switched to pure hydrogen at a flow rate of 500 sccm. The temperature was slowly raised to 120° C. at a temperature interval of 1° C./minute, held there for a period of one hour, then raised to 250° C. at a temperature interval of 1° C./minute and held at that temperature for 10 hours. After this time, the catalyst was cooled to 180° C. while remaining under a flow of pure hydrogen gas.

Fischer-Tropsch activity

Catalysts prepared and activated as described above were each subjected to a synthesis run in which the catalyst was contacted with syngas containing hydrogen and carbon monoxide. Experimental conditions and results are given in Table 4.

TABLE 4

| | Comparative Example 2 | Comparative Example 3 |
| --- | --- | --- |
| Run Conditions | | |
| Temperature, ° C. | 227 | 227 |
| Pressure, psig | 326 | 326 |
| Space Velocity, cc/g/h | 5000 | 5000 |
| H₂/CO ratio | 1.6 | 1.6 |
| Results | | |
| CO Conversion, (mol %) | 50.9 | 49.7 |
| C₅₊ Productivity, g/g/h | 0.401 | 0.403 |
| Selectivity, mol % | | |
| CH₄ | 5.1 | 4.2 |
| C₂ | 0.8 | 0.7 |
| C₃ | 2.5 | 2.3 |
| C₄ | 2.8 | 2.5 |
| C₅+ | 87.0 | 88.3 |
| CO₂ | 1.8 | 2.0 |

It can be seen from Table 4 that the performance of the catalyst on the vanadium-phosphorus modified support did not affect the FT performance of the catalyst on the unmodified alumina with same cobalt loading.

As shown Table 5, the catalysts prepared using an impregnation with a second solution containing glutaric acid having a lower average $Co_3O_4$ crystallite size show a higher level of catalytic activity.

TABLE 5

|  | Comparative Example 3 | | | Example 5 | | | Example 7 | | | |
|---|---|---|---|---|---|---|---|---|---|---|
| Run Conditions | | | | | | | | | | |
| Temperature, ° C. | 227 | 227 | 227 | 227 | 227 | 227 | 227 | 227 | 227 | 227 |
| Pressure, psig | 326 | 326 | 326 | 326 | 326 | 326 | 326 | 326 | 326 | 326 |
| Space Velocity, cc/g/h | 6500 | 5000 | 4000 | 9000 | 8000 | 9000 | 8000 | 6500 | 5000 | 4000 |
| $H_2$/CO ratio | 1.6 | 1.6 | 1.6 | 1.6 | 1.6 | 1.6 | 1.6 | 1.6 | 1.6 | 1.6 |
| Results | | | | | | | | | | |
| CO Conversion, (mol %) | 48.6 | 49.7 | 44.1 | 48.5 | 49.3 | 48.2 | 48.5 | 50.6 | 53.2 | 559 |
| $C_{5+}$ Productivity, g/g/h | 0.520 | 0.403 | 0.278 | 0.720 | 0.647 | 0.726 | 0.644 | 0.542 | 0.432 | 0.354 |
| Selectivity, mol % | | | | | | | | | | |
| $CH_4$ | 4.1 | 4.2 | 5.0 | 4.2 | 4.0 | 3.7 | 3.8 | 3.6 | 3.5 | 3.4 |
| $C_2$ | 0.6 | 0.7 | 0.9 | 0.5 | 0.6 | 0.4 | 0.5 | 0.5 | 0.6 | 0.5 |
| $C_3$ | 2.1 | 2.3 | 2.9 | 1.9 | 1.9 | 1.6 | 1.7 | 1.8 | 1.9 | 2.0 |
| $C_4$ | 2.3 | 2.5 | 3.1 | 2.4 | 2.4 | 2.0 | 2.2 | 2.2 | 2.3 | 2.4 |
| $C_{5+}$ | 89.5 | 88.3 | 85.6 | 89.8 | 89.3 | 91.1 | 90.3 | 89.7 | 88.3 | 86.3 |
| $CO_2$ | 1.3 | 2.0 | 2.4 | 1.2 | 1.7 | 1.1 | 1.4 | 2.1 | 3.4 | 5.3 |

Unless otherwise specified, the recitation of a genus of elements, materials or other components, from which an individual component or mixture of components can be selected, is intended to include all possible sub-generic combinations of the listed components and mixtures thereof Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A Fischer Tropsch catalyst prepared according to a process comprising:
   a. preparing a catalyst precursor by:
      i. impregnating an alumina catalyst support material with a first solution comprising ammonium metavanadate and phosphoric acid, to obtain a treated catalyst support material;
      ii. calcining the treated catalyst support material at a temperature of at least 500° C. to obtain a modified catalyst support having a modified support surface area and a pore volume of at least 0.4 cc/g; wherein the modified catalyst support loses no more than 8% of the pore volume when exposed to a water vapor; and
      iii. contacting the modified catalyst support with a second solution comprising a precursor compound of an active cobalt catalyst component and glutaric acid to obtain the catalyst precursor; and
   b. reducing the catalyst precursor to activate the catalyst precursor to obtain the Fischer Tropsch catalyst.

2. The Fischer Tropsch catalyst of claim 1, wherein the Fischer Tropsch catalyst loses not more than 10% of its Fischer Tropsch catalyst-pore volume when exposed to the water vapor.

3. The Fischer Tropsch catalyst of claim 1, wherein the Fischer Tropsch catalyst loses no more than 8% of its Fischer Tropsch catalyst-pore volume when exposed to the water vapor.

4. The Fischer Tropsch catalyst of claim 1, wherein the Fischer Tropsch catalyst loses not more than 10% its Fischer Tropsch catalyst-pore volume when the Fischer Tropsch catalyst is contacted with a feed stream at a contacting temperature greater than 200° C. in the presence of the water vapor.

5. The Fischer Tropsch catalyst of claim 1, wherein the Fischer Tropsch catalyst comprises $Co_3O_4$ crystallites having an average size of no greater than 20 nm.

6. The Fischer Tropsch catalyst of claim 1, wherein the Fischer Tropsch catalyst comprises $Co_3O_4$ crystallites having an average size of from 6 to 20 nm.

7. The Fischer Tropsch catalyst of claim 1, wherein the Fischer Tropsch catalyst has a crystallite size distribution having a FWHM of less than 200 angstroms.

8. The Fischer Tropsch catalyst of claim 1, wherein the Fischer Tropsch catalyst has a crystallite size distribution having a FWHM of from 80 to 160 angstroms.

9. The Fischer Tropsch catalyst of claim 1, wherein the Fischer Tropsch catalyst has a crystallite size distribution having a FWHM of from 90 to 120 angstroms.

10. The Fischer Tropsch catalyst of claim 1, wherein the first solution comprises a vanadium and a phosphorus at a molar ratio of the vanadium to the phosphorus of from 0.05 to 6.0.

11. A Fischer-Tropsch synthesis process, comprising: contacting a gaseous mixture comprising carbon monoxide and hydrogen with the Fischer Tropsch catalyst of claim 1 at a pressure of from 0.1 to 3 MPa and at a contacting temperature of from 180 to 260° C., thereby producing a product comprising $C_{5+}$ hydrocarbons.

* * * * *